United States Patent [19]

Sun

[11] Patent Number: 4,789,075
[45] Date of Patent: Dec. 6, 1988

[54] COLLAPSIBLE PLASTIC CRATE

[76] Inventor: Ko-Lin Sun, No. 4, Song Bor Lane, Fu Shing Road, Li Shan Tsuen, Her Pyng Shiang, Tai Chung Shian, Taiwan

[21] Appl. No.: 78,785

[22] Filed: Jul. 28, 1987

[51] Int. Cl.⁴ .......................... B65D 6/18; B65D 21/02
[52] U.S. Cl. ..................................... 220/4 F; 206/508; 206/804; 220/6
[58] Field of Search .......................... 220/4 F, 6, 7, 93; 206/508, 804

[56] References Cited

U.S. PATENT DOCUMENTS

| | | | |
|---|---|---|---|
| 1,883,553 | 10/1932 | Chain | 220/4 F |
| 1,942,713 | 1/1934 | Klinka | 220/4 F |
| 2,296,215 | 9/1942 | Layher | 220/93 |
| 2,530,481 | 11/1950 | Ravin | 220/4 F |
| 2,893,588 | 7/1959 | Martin | 206/508 |
| 3,182,847 | 5/1965 | Fuller | 220/4 F |
| 3,606,034 | 9/1971 | Lewis | 206/804 |
| 4,291,231 | 9/1981 | Heggbelond | 220/6 |
| 4,300,695 | 11/1981 | Hsu | 220/4 F |

FOREIGN PATENT DOCUMENTS

| | | | |
|---|---|---|---|
| 1337862 | 8/1967 | France | 220/4 F |
| 1163354 | 9/1969 | United Kingdom | 220/4 F |

*Primary Examiner*—George E. Lowrance
*Attorney, Agent, or Firm*—Bacon & Thomas

[57] ABSTRACT

A collapsible plastic crate, especially one which is recoverable and reusable, characterized by comprising a bottom plate, a top lid plate, a pair of front and back side plates and a pair of left and right side plates with sockets pins, hook, flat projections, holes and slots, and being constructed in such way that it can be folded compactly for shipping and storing and the contents can be raised by a lifting device for inspection purpose without causing any damage to the contents.

3 Claims, 8 Drawing Sheets

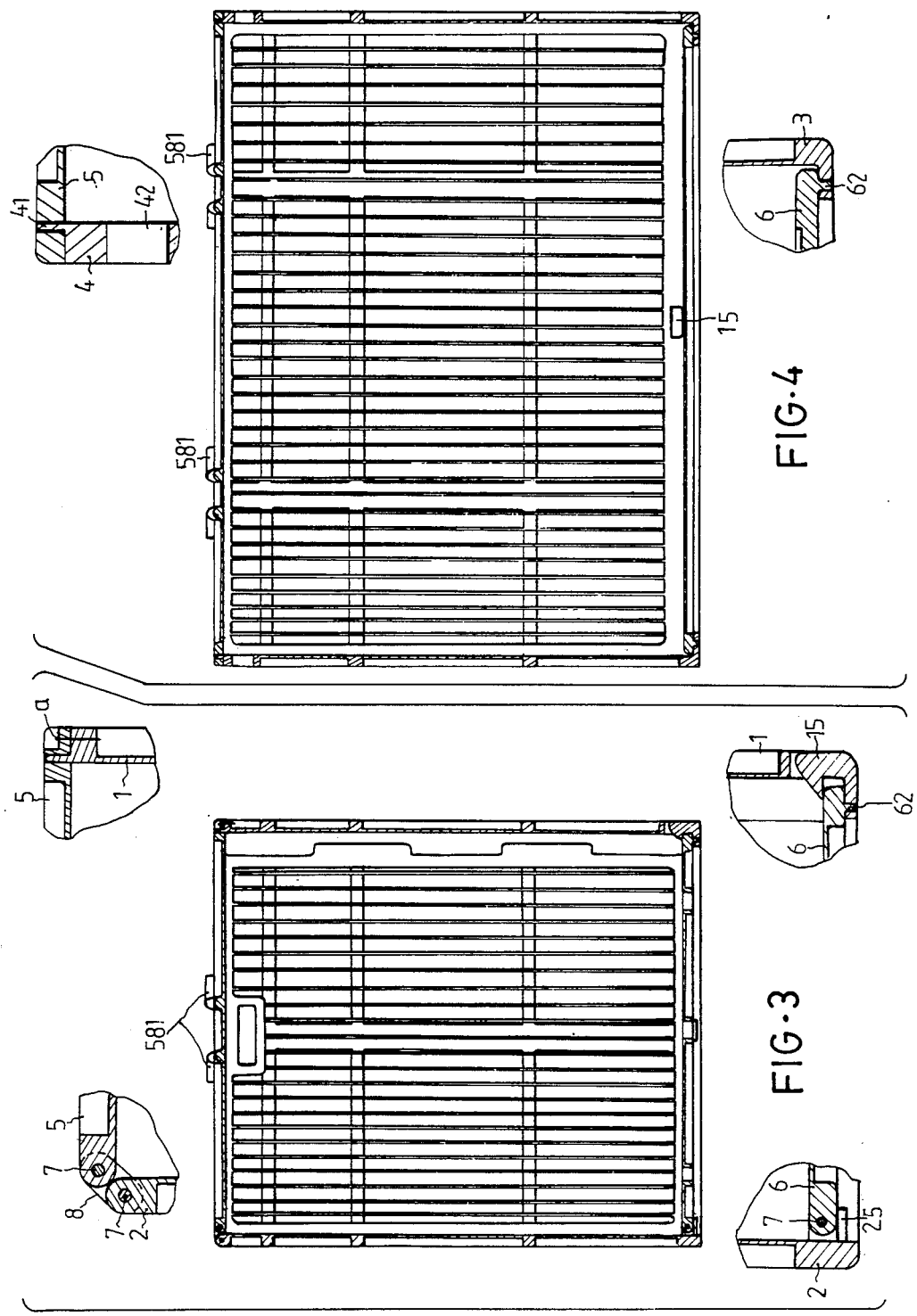

COLLAPSIBLE PLASTIC CRATE

BACKGROUND AND SUMMARY OF THE INVENTION

Cartons have been widely used for packing fruits and other things to be shipped or stored. But it takes time to staple the carton folds together and it is wasteful because they are not recoverable and reusable. Furthermore, cartons are not strong enough for shipping in stack. It is often the case that the contents in the cartons being stacked by other cartons are damaged. To inspect the contents, they must be taken out one by one or layer by layer. After inspection they must be packed back. So using cartons is not only a waste of money but also a waste of time and laborious. In the past years, the inventor himself used about 5,000 cartons a year for packing fruits. At the current market price of $1.5 per carton, the total cost was $7,500 enough for 255 cartons of fruits. The amount would be terribly huge for the cartons used in the whole country. According to the inventor's statistics, the cost of cartons almost accounted for more than 50 percent of the sale amount of fruits a farmer had harvested. So if a strong, collapsible, recoverable and reusable container is developed to replace cartons, it would save the farmer a lot of money, time and trouble.

In view of this, the inventor studied hard with some intimate friends to make improvements and developed this invention.

So the main object of this invention is to provide a collapsible crate which has high compression strength to ensure safety of shipping and storing.

Another object of this invention is to provide a collapsible crate which is recoverable and reusable so as to save money.

Still another object of this invention is to provide a collapsible crate of which the contents can be raised by lifting device for inspection purpose.

BRIEF DESCRIPTION OF THE DRAWINGS

The present invention will become more readily apparent from the following description of the preferred embodiment taken in conjunction with the accompanying drawings, in which:

FIG. 3 is sectional view taken along the A—A line in FIG. 2.

FIG. 4 is a sectional view taken along the B—B line in FIG. 2.

DETAILED DESCRIPTION OF THE PREFERRED EMBODIMENT

Figure 1:
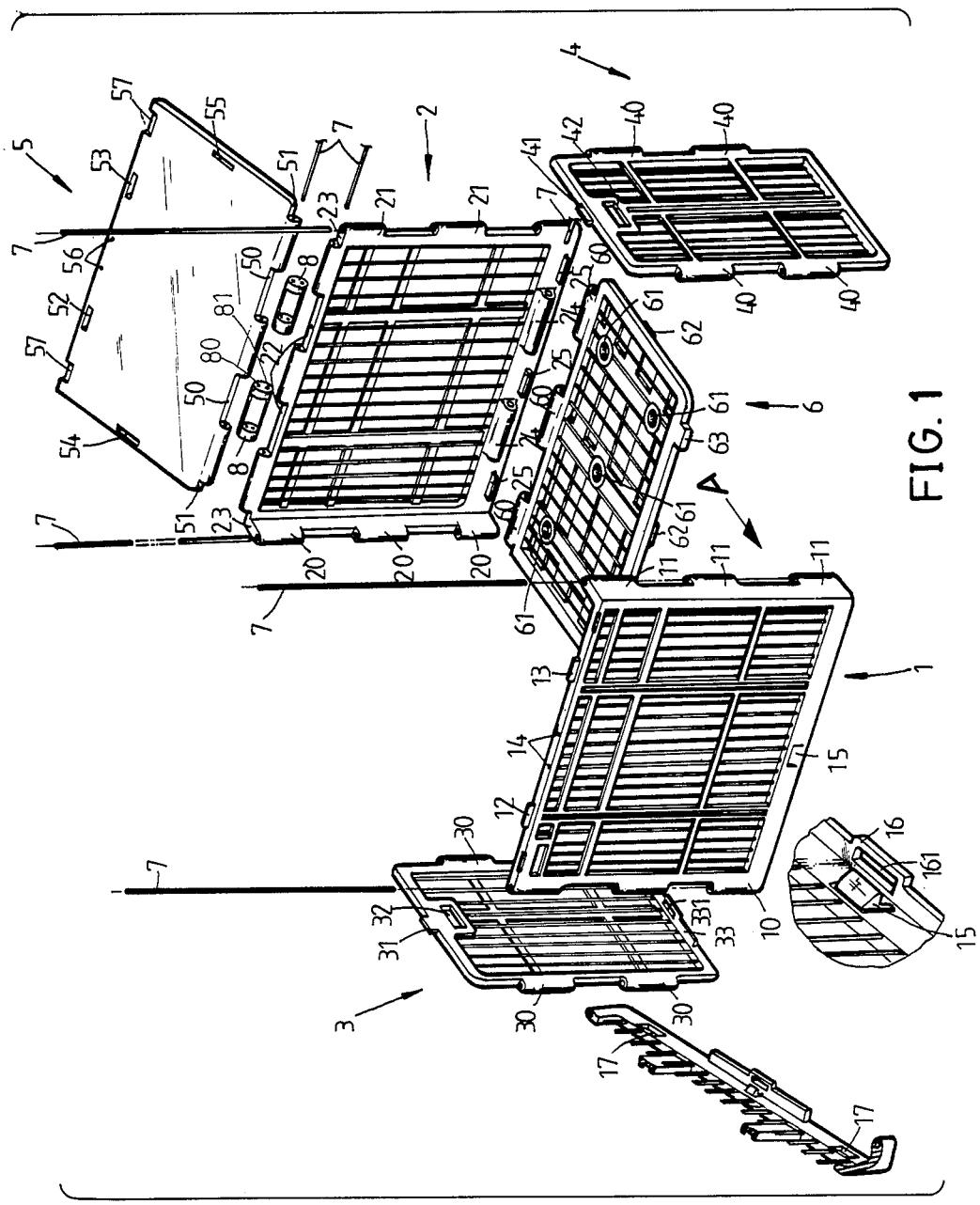
FIG. 1 is an exploded view of the collapsible plastic crate of this invention.
Figure 2:
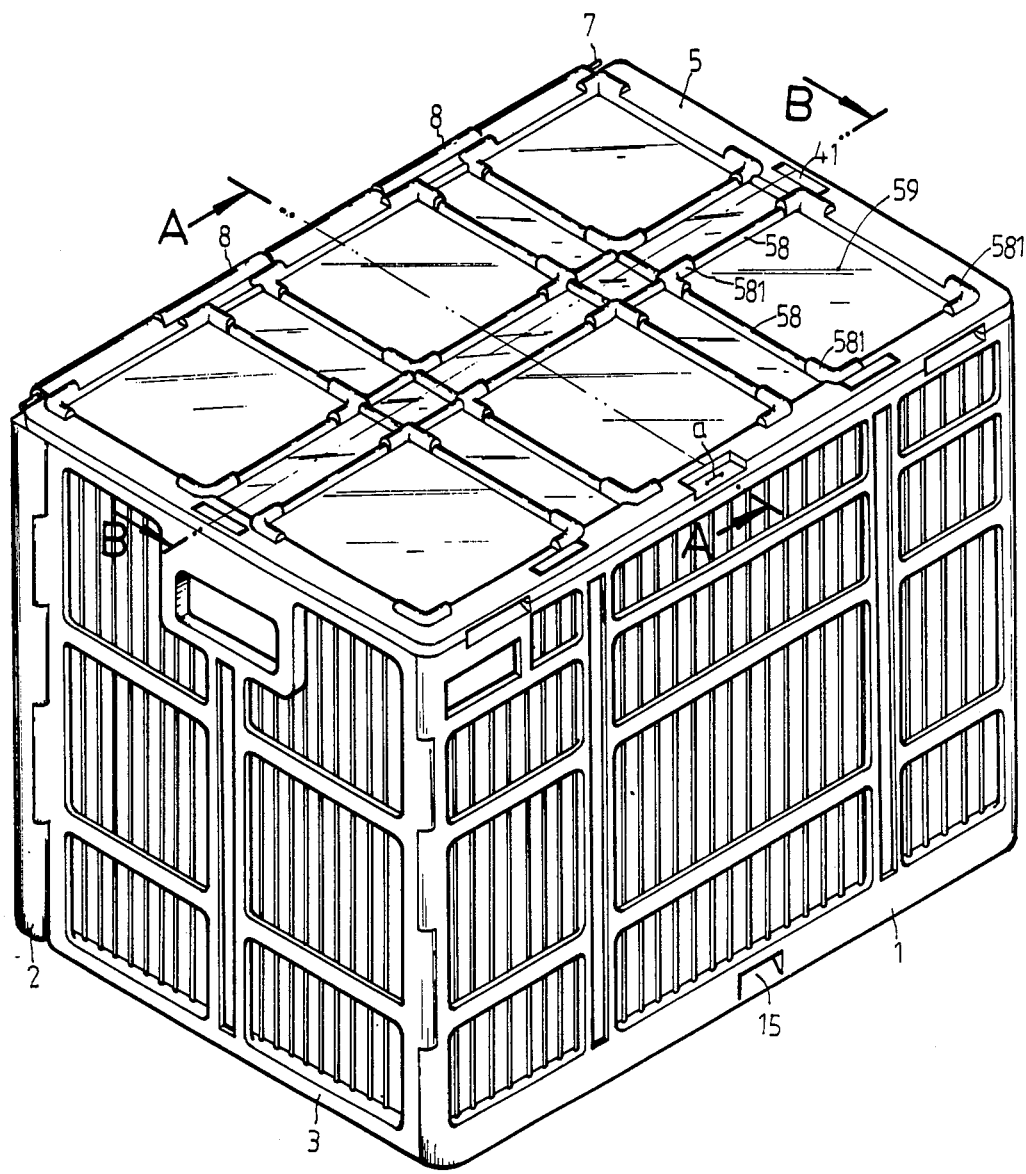
FIG. 2 is a vertical view of the said crate.

As shown in FIG. 1, the collapsible plastic crate comprises a front side plate 1, a back side plates 2, a left side plate 3, a right side plate 4, a top lid plate 5, a bottom plate 6, seven knuckle pins 7 in same diameter, and two tubular connectors 8. The front side plate, has leftward spaced sockets 10 on the left edge, backward spaced sockets 11 on the right edge, two projections 12, 13 on the top edge, two small holes 14 in the top edge for tying the top lid plate 5 with a wire, a hook 15 and a lug 16 in the middle of the bottom edge and two slots 17 in the same edge near the corners. The said lug 16 has a slot 161 for the projection 62 to fit in for the purpose to strengthen the binding. The back side plate 2 has forward spaced sockets 20 on the left edge, rightward spaced sockets 21 on the right edge, two notches 22 at the top edge to accommodate the two tubular connectors 8, two indentures 23 at the corners, two forward spaced sockets 24 on the bottom edge, three flat projections 25 to keep the bottom plate 6 from turning downward and to allow it to fold upward only. The left and right side plates 3, 4 are made with same mold. The left side plate 3 has outward spaced sockets 30 on both front and rear edges to form a hinged joint respectively with the sockets 10 of the front side plate 1 and the sockets 20 of the back side plate 5 by means of a pin 7. The right side plate 4 has outward spaced sockets 40 on both front and rear edges to form a hinged joint respectively with the sockets 11 of the front side plate 1 and the back side plate 2 by means of a pin 7. The left and right side plates 3, 4 have projections 31, 41 on the top edges for snapping in the slots 54, 55 of the top lid plate 5, hand holes 32, 42 below the projections 31, 41, and projections 33, 34 having slots 331, 431 are arranged in such way that they are between the projections 16 of the front side plate 1 and the projections 25 of the back side plate 2 after the crate is folded. The top lid plate 5 has notches 50 and indentures 51 at the rear edge to form a hinged joint with the back side plate 2 by means of pins and tubular connectors, and slots 52, 53, 54, 55 in the front edge and left and right edge for the projections 12, 13 of the front side plate 1 and the projections 31, 41 of the left and right side plates to fit in after it is closed. The top lid plate 5 also has two small holes 56 in the front edge corresponding to the small holes 14 in the top edge of front side plate 1, and two recesses 57 to facilitate the opening of the top lid plate 5. Six ribs 58 are provided on the top surface of the top lid plate 5 as shown in FIG. 2. Two vertical ribs 58 intersect four horizontal ribs 58 to form six large squares 59. The angle part 581 of each corner of the squares 59 is made a little thicker to prevent the crate stacked thereon from slipping off. The bottom plate 6 has sockets 60 on the rear edge to form hinged joint with those of the back side plate 2 by means of a pin 7, five holes 61 for use in lifting the contents of the crate, projections 62 on the front, left and right edges to fit in the slots 161, 331, 431 of the lugs 16, 33, 43 of the front, left and right side plates 1, 3, 4, and two projections 63 on the front edge to strengthen the binding of the two plates 1, 6 together with the hook 15 at the bottom edge of the front side plate 1, which keeps the bottom plate from springing upward and off the front side plate 1. The knuckle pins 7 are used to join the sockets to form hinged joints. The tubular connectors 8 are oval in cross section and sized to fit in the notches 50 in the top edge of the back side plate 5 and has holes 80, 81 for the knuckle pins 7 to fit in and to form a hinged joint of the top lid plate 5 and the back side plate 2.

To assemble the crate as shown in FIG. 2, the bottom plate 6 and the back side plate 2 are first joined together by inserting the pin 7 into the sockets 60 of the bottom plate 6 and the sockets 24 of the back side plate 2 with the flat projections 25 beside the sockets 24 supporting the bottom plate 6 and preventing the same from further opening. Then the left and right side plates 3, 4 are hinged together with the back side plate 2 by inserting the pins 7 in the sockets 20, 30, 21, 40, and having the knuckle pins 7 locked with snap rings at the top and bottom ends. In the same way, the left and right side plates 3, 4 are hinged together by inserting the pins 7 into the sockets 10, 30, 11, 40 and having the pins locked with snap rings at the top and bottom ends. At the same time, the projections 62, 63 of the bottom plate 6 is fitted in the slots 331, 431 of the lugs 33, 43 of the left and right side plates 3, 4, and in the slot 161 of the lug 16 and the slots 17 in the bottom edge of the front side plate 1. As shown in FIG. 3 the bottom plate is retained by the hook 15 at the bottom edge of the front side plate 1 and prevented from spring up. Finally, the top lid plate 5 is closed with the projections 12, 13, 31, 41 fitted in the slots 52, 53, 54, 55 as shown in FIG. 4, and wire a is inserted in the holes 56 and 14 and tied and fixed with lead or zinc at the bottom edge of the front side plate 1. Thus, the crate is ready for shipping.

Figure 5:
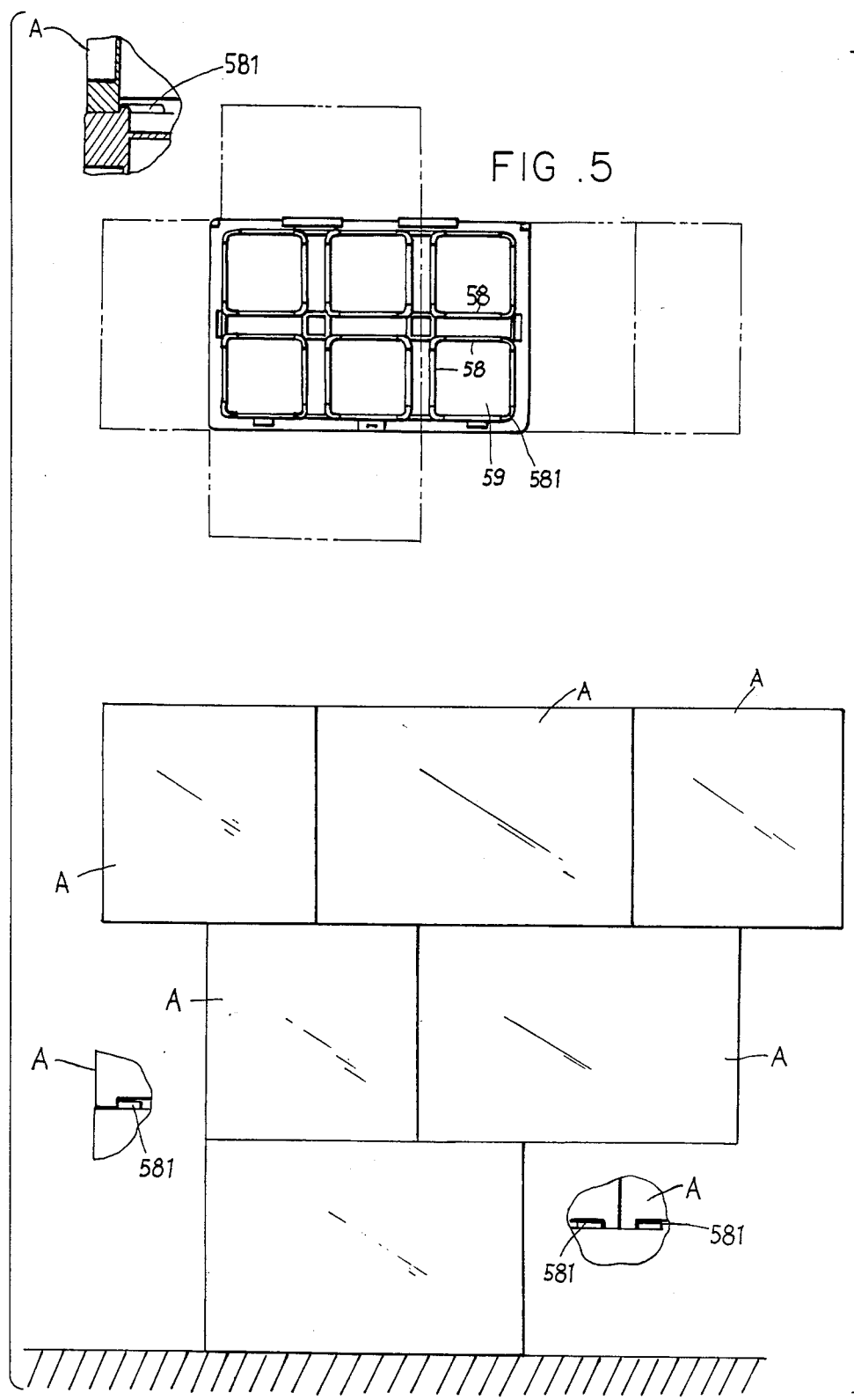
FIG. 5 illustrates the stacking of the said crates.

As shown in FIG. 5, the crates of this invention can be shipped in stack. The crate has a fixed ratio of length and width—3:2 and the ribs 58 provided on the top surface intersect to form six large squares 59 of which the angle parts 581 are thicker. So the bottom of the crate on top fits the top of the crate beneath closely without fear of slipping off. And the crates are strong enough to be shipped in a large stack without fear of damage to the contents.

Figure 6:
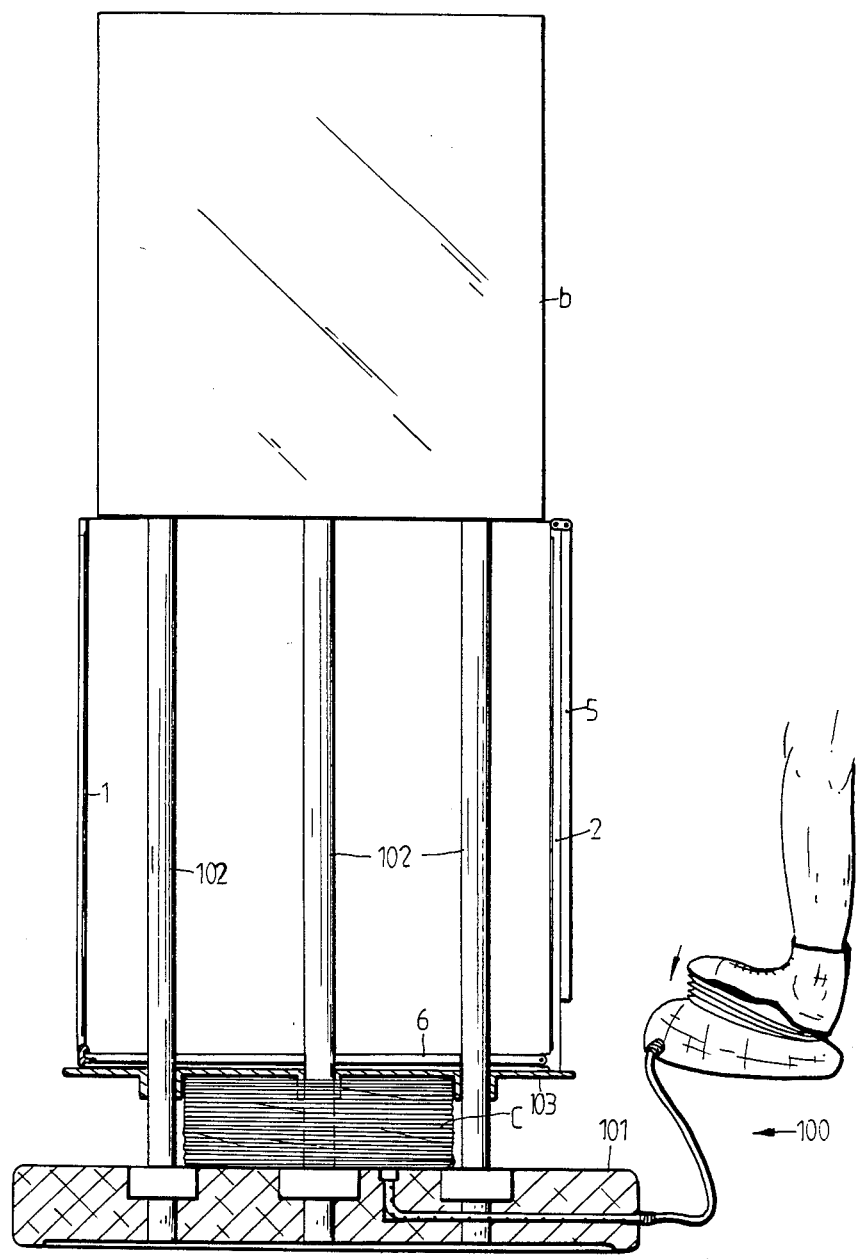
FIG. 6 illustrates the application of a pneumatic lift to raise the contents from the crate.
Figure 7:
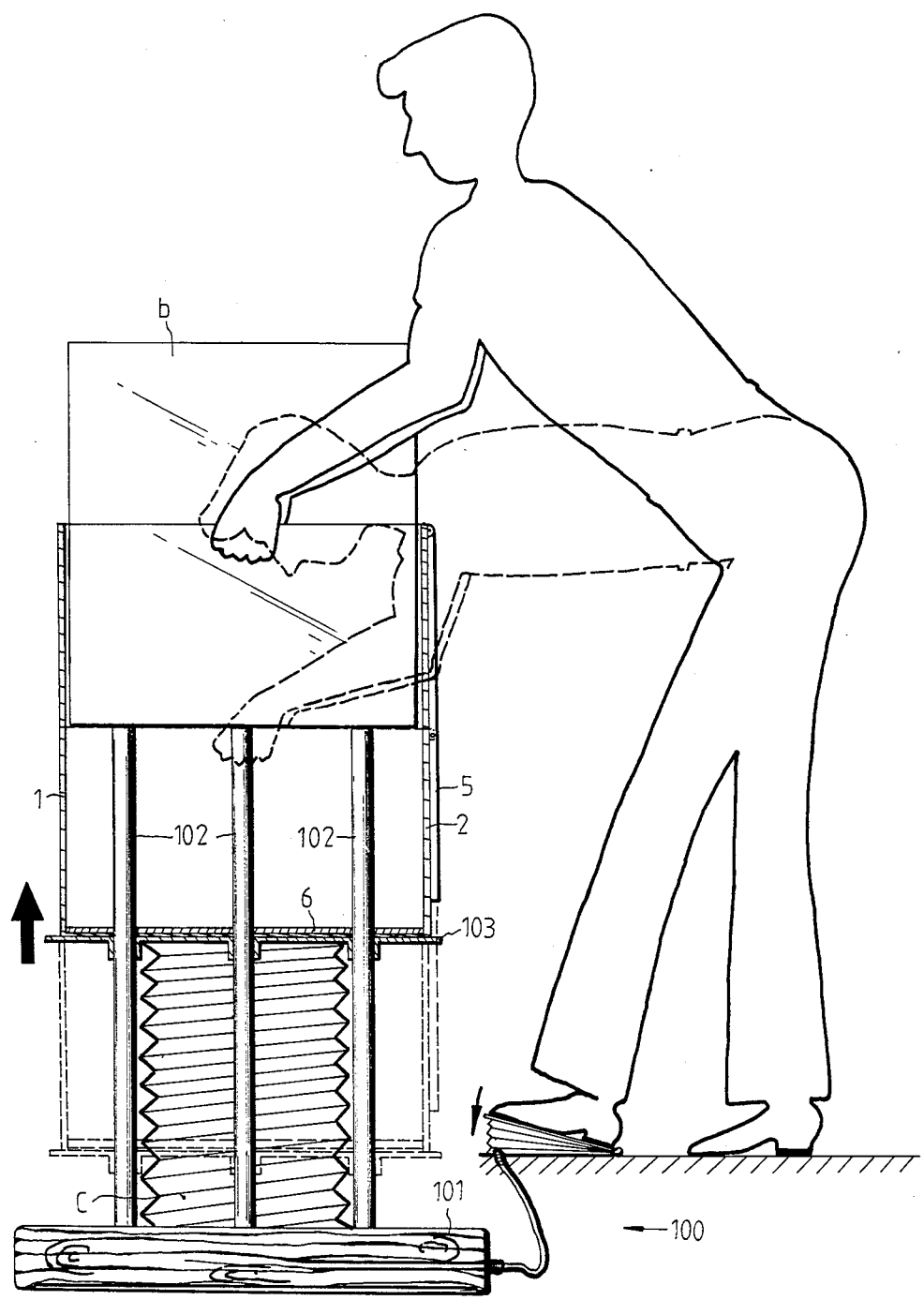
FIG. 7 illustrates the application of a pneumatic lift to lower the raised contents.
Figure 8:
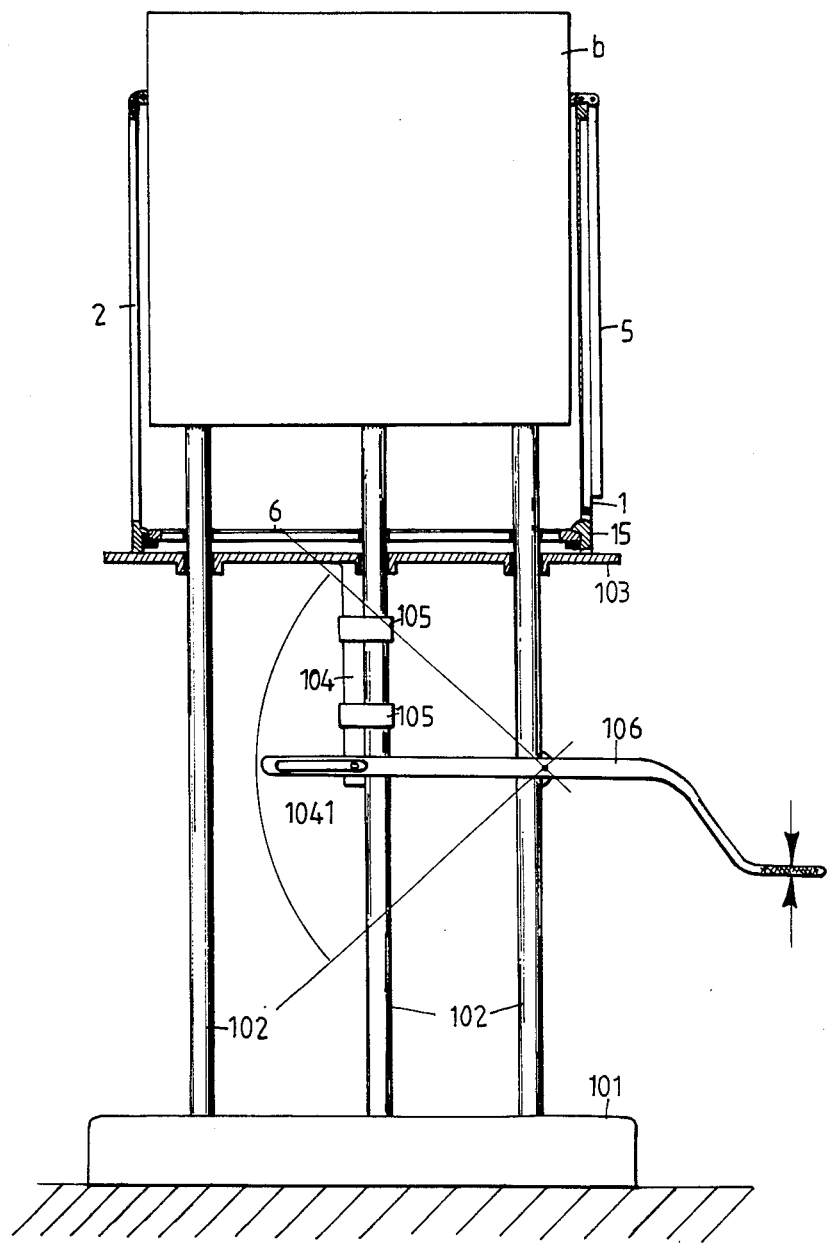
FIG. 8 illustrates the application of another lifting device to raise and lower the contents of the said crate.

It is a common practice to take out the contents one by one (or layer by layer) when a buyer want to inspect the contents. After inspection, they are put back one by one (or layer by layer). It is troublesome and time wasting to do so and damage would be caused to the contents. To eliminate this disadvantage, the inventor developed this invention which by using of a simple lifting device is capable of taking out or putting back the contents quickly without causing any damage to the contents. As shown in FIG. 6 the crate is placed on the pneumatic lift with its five posts 102 fitted in the five holes 61 in the bottom plate 6. When the crate body held by the operator is lowered slowly, the contents b supported by the five posts 102 are not lowered but come out of the crate. After inspection by the buyer, the pneumatic lift c is inflated and the crate body held by the operator is pushed up pneumatically until the contents b are fully packed in the crate as shown in FIG. 7. After the top lid plate 6 is closed and tied with wire a, the inspection operation is finished. The application of another lifting device is shown in FIG. 8. The law of lever is applied to this lifting device which comprises a stand 101, five posts 102, a guide rod 104, two retaining rings 105 for retaining the guide rod 104 at the central post 102, and a lever 106. The lever 106 is fitted in the rod 104 at one end and supported at the fulcrum by a post 102. With this lever 106, the crate placed on the slide 103 can be raised and lowered. Thus, the contents in the crate can be removed from the crate without causing any damage.

Figure 9:
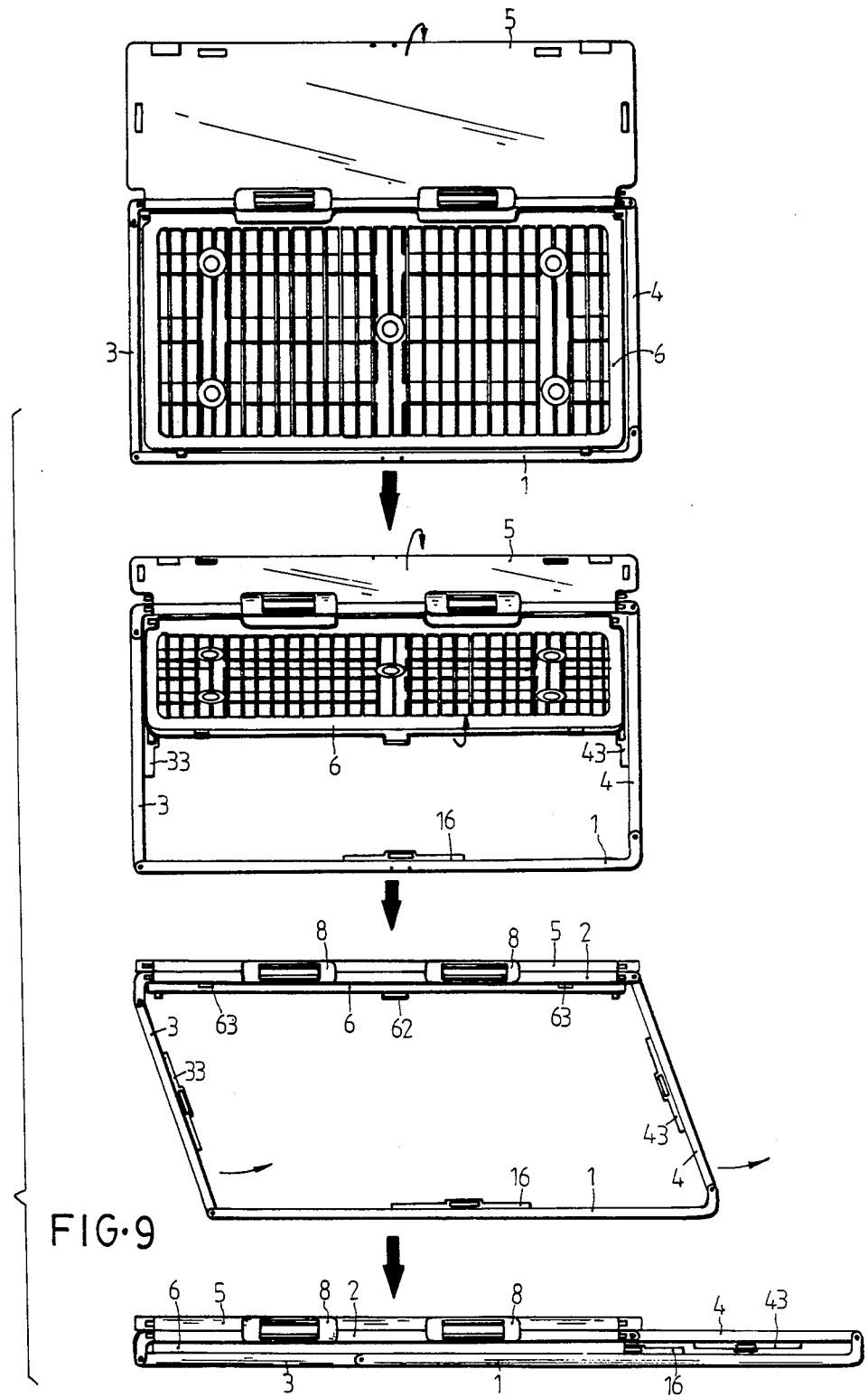
FIG. 9 illustrates the collapsing of the said crate.

The collapsing of crate is shown in FIG. 9. First, the wire a is cut off and the top lid plate 5 is opened as arrowed with the hand in the recess 57. After the contents removed, the front side plate 1 is disassembled by pulling outward the hook 15 at the bottom edge and letting the bottom plate 6 turn up as arrowed and folded upon the back side plate 2. Then the joint of the left side plate 3 and the front side plate 1 is pushed rearward and rightward as arrowed. At this time the right side plate turns as though it was a parallelogram. It is pushed until the left side plate 3 and the front side plate 1 become a straight line. Like a flat board the collapsed crate is space saving when being shipped or stored.

I claim:

1. A collapsible plastic crate, especially one which is recoverable and reusable, characterized by comprising:
    a back side plate ribbed and having forward, upward leftward and forward sockets on the left, top right, and bottom edges, two notches at the top edge between the sockets for two tubular connectors, two indentures at both ends of the top edge, and flat projections at the bottom edge to block and support the bottom plate,
    a bottom plate having rearward sockets to form a hinged joint with those of the back side plate by means of a pin, and flat projections on the front, left and right edges,
    a top lid plate having sockets and notches on the rear edge to form a joint with those on the top edge of the back side plate by means of pins and oval tubular connectors, slots in the front, left and right edges, two small holes in the front edge, and ribs intersecting to form six large squares with thicker angle parts to prevent the stacked crate from slipping off.
    a front side plate having leftward and rearward sockets on the left and right edges, two small holes in the top edge corresponding in size to the small holes in the top lid plate for a wire to tie the top lid plate after being closed, flat projections on the top edge beside the small holes, a hook in the middle of the bottom edge to retain the bottom plate, a lug behind the hook, and slots near both ends of the bottom edge for the flat projections of the bottom plate to fit in for strengthening the binding,
    left and right side plates having sockets on the front and rear edges to form hinged joints with the front and back side plates by means of pins, flat projections on the top edges to fit in the slots in the left and right edges of the top lid plate, hand holes below the flat projections on the top edges, lugs on the insides of the bottom edges with slots for the flat projections on the left and right edges to fit in to strengthen the binding,
    and being constructed in such way that the top lid plate can be turned up and folded upon the back side plate, the bottom plate can be turned up and folded upon the back side plate, and the left side plate and the front side plate can be pushed to be on a straight line and become a flat board for easy shipping and storing.

2. A collapsible plastic crate according to claim 1 wherein the bottom plate has five holes for pneumatic lift or other lifting devices to raise the contents of the crate for inspection purpose without fear of causing any damage to the contents.

3. A collapsible plastic crate according to claim 2 wherein the lifting device has at least a stand, three posts and a slide fitted on the posts.

* * * * *